(12) United States Patent
Chen et al.

(10) Patent No.: US 8,200,753 B2
(45) Date of Patent: Jun. 12, 2012

(54) INSTANT MESSAGING METHOD AND SYSTEM

(75) Inventors: Jian Chen, Shenzhen (CN); Wei Xu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 147 days.

(21) Appl. No.: 12/676,864

(22) PCT Filed: Sep. 12, 2008

(86) PCT No.: PCT/CN2008/072352
§ 371 (c)(1),
(2), (4) Date: Mar. 5, 2010

(87) PCT Pub. No.: WO2009/033430
PCT Pub. Date: Mar. 19, 2009

(65) Prior Publication Data
US 2010/0274843 A1    Oct. 28, 2010

(30) Foreign Application Priority Data

Sep. 12, 2007   (CN) .......................... 2007 1 0149576

(51) Int. Cl.
G06F 15/16    (2006.01)
(52) U.S. Cl. ......................... 709/203; 709/206; 370/522

(58) Field of Classification Search .................. 709/203, 709/206; 370/522
See application file for complete search history.

(56) References Cited

U.S. PATENT DOCUMENTS

| | | |
|---|---|---|
| 2006/0029106 A1 | 2/2006 | Ott et al. |
| 2006/0167991 A1 | 7/2006 | Heikes et al. |
| 2007/0006308 A1 | 1/2007 | Desouza et al. |
| 2007/0203993 A1 | 8/2007 | Cai et al. |

FOREIGN PATENT DOCUMENTS

| | | |
|---|---|---|
| CN | 1642147 A | 7/2005 |
| CN | 1874233 A | 12/2006 |
| CN | 1997009 A | 7/2007 |
| CN | 101114980 A | 1/2008 |

OTHER PUBLICATIONS

International Search Report for PCT/CN2008/072352, ISA/CN mailed Dec. 25, 2008.
Chinese Office Action for Chinese Patent Application No. 200710149576.4, dated Jul. 3, 2009, and English translation thereof.

*Primary Examiner* — Adnan Mirza

(57) ABSTRACT

A method and system for establishing an Instant Messaging (IM) relationship are provided. The method for establishing the IM relationship includes: sending user information of a first user to an IM client of a second user, checking whether the user information of the first user meets filter conditions of the second user; establishing the IM relationship between the first user and the second user when the user information of the first user meets the filter conditions of the second user.

11 Claims, 2 Drawing Sheets

INSTANT MESSAGING METHOD AND SYSTEM

This application claims the benefit of Chinese Patent Application No. 200710149576.4 filed on Sep. 12, 2007, and entitled "Method and System for Establishing Instant Messaging relationship". The disclosure of the above application is incorporated herein by reference.

FIELD OF THE TECHNOLOGY

The present invention relates to Instant Messaging (IM) technologies, and more particularly, to an IM method and system.

BACKGROUND OF THE INVENTION

In recent years, along with the development of the Internet, there are more and more Internet users. A main function of the Internet is that many Internet users use the Internet for mutual communication, e.g., use software tools, such as Email and Instant Messenger for sending messages to each other, to achieve the objective of mutual communication. The Instant Messenger is very popular among Internet users due to its advantages, such as good real time and convenience of usage.

When using the Instant Messenger, a user usually needs to add other users as contacts, and then communicates IM messages with each contact using the Instant Messenger, for instant chats.

Most of existed Instant Messengers need the users to actively search for other users whose user information meets expected conditions, and then add the found users as contacts. Here, the user information includes user identifier, nickname, sex, age, job, region, and whether having a camera or not, etc. For instance, after a user logs on, a searching request is sent to an IM server with information such as, sex and age. According to searching condition input by the user, the IM server returns a searching result satisfying the searching condition. The searching result is user identifier satisfying the searching condition, and may include other information. According to the searching result returned by the IM server, the user further checks other information about the user identifiers searched out, determines the user to be added as contact, and sends a request to the IM server to request for adding the selected user as contact. The IM server forwards the request to the requested party. After receiving the request, the requested party may choose to accept or refuse. Furthermore, the requested party may also request to add the requesting party as a contact through the IM server.

Although the conventional method for adding contacts may satisfy ordinary requirements of the users, the method needs the user to do manual searching and selecting. The whole process is relatively complicated for the user. In addition, the success rate for users adding contacts with the method is relatively low. According to statistics, times of successfully adding contacts are about 10% of those of initiating the request for adding the contacts. That is to say, the success rate for adding contacts with this method is about 10%. The inventor of the present invention finds that when using the method, most failure reasons are that the information of the requesting party is not matched with the expected condition of the requested party, i.e., the requested party is not satisfied with the information of the requesting party.

Thus, a technical scheme for a user to add a requesting party as contact is necessary, in which the expected condition of the requested party is matched with the user information of the requesting party, so as to improve success rate and efficiency for adding contacts.

SUMMARY OF THE INVENTION

In view of above, embodiments of the present invention provide a method and system for establishing an Instant Messaging (IM) relationship, so as to improve success rate for establishing the IM relationship.

An embodiment of the present invention provides a method for establishing an IM relationship, including:
receiving user information of a first user; and
initiating an IM to a first IM client and establishing an IM relationship with the first IM client, when the user information of the first user meets filter conditions of a second user.

An embodiment of the present invention further provides another method for establishing an IM relationship, including:
receiving, by a server, user information set by a first user, and sending the user information of the first user to a second IM client when a release flag in the user information of the first user is on; and
receiving, by the second IM client, the user information of the first user, initiating an IM to a first IM client and establishing an IM relationship with the first IM client when the user information of the first user meets filter conditions of a second user.

An embodiment of the present invention further provides a system for establishing an IM relationship, including:
a server, configured to send user information of a first user to a second IM client of a second user; and
the second IM client, configured to check whether relevant information of the first user meets filter conditions of the second user, and establish an IM relationship between the first user and the second user when the relevant information of the first user meets the filter conditions of the second user.

It can be seen from the above scheme of the present invention, since in the embodiments of the present invention, when the user information of the first user meets the filter condition of the second user, the IM is initiated to the first IM client and an IM relationship is established with the first IM client. The scene that the IM relationship is still established even if the user information of the first user doesn't meet the filter condition of the second user may be avoided, and the success rate for establishing the IM relationship may be enhanced.

EMBODIMENTS OF THE INVENTION

The implementing idea of embodiments of the present invention is further described in detail hereinafter taking specific embodiments for example, so as to make the objective, technical solution and merits thereof more apparent.

Figure 1:
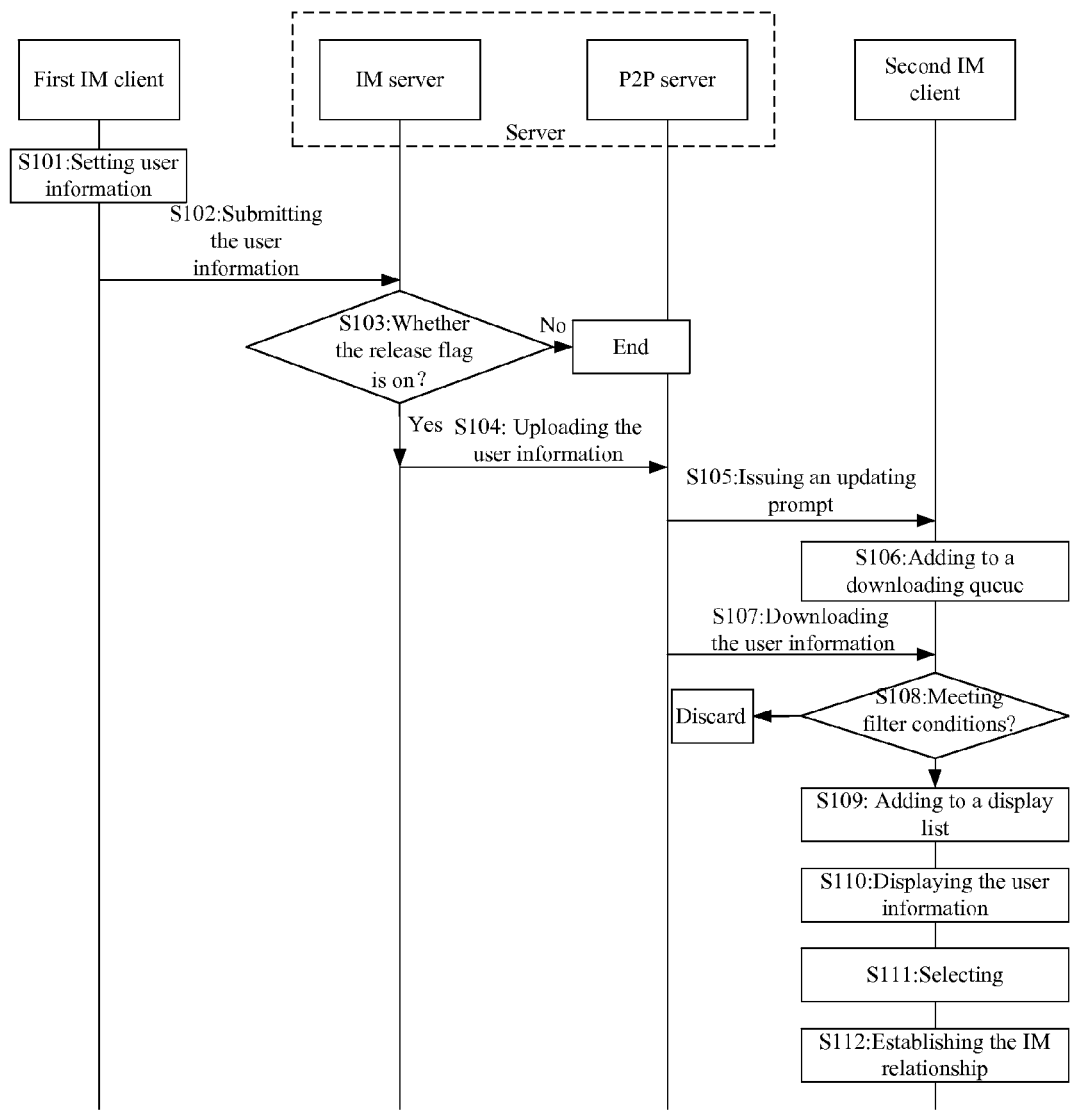
FIG. 1 is a flow chart illustrating a process for establishing an Instant Messaging (IM) relationship in accordance with an embodiment of the present invention.

FIG. 1 is a flow chart of an embodiment of the present invention. To make the descriptions more apparent, in the following descriptions, a requesting party and a requested party are respectively distinguished with a first user and a second user, meanwhile client of the requesting party and client of the requested party are respectively distinguished with a first IM client and a second IM client.

Establishing an IM relationship between the first user and the second user in this embodiment mainly includes at least one of the following situations: a party adds the other party as a contact; two parties add each other as contacts; a party sends an IM message to the other party; and two parties send IM messages to each other for conversation.

With reference to FIG. 1, the method in this embodiment of the present invention includes the following steps.

Step S101: a first IM terminal obtains user information of a first user. The user information of the first user may include age, sex and job, etc.

From the first user's point of view, the first user sets his/her user information, such as his/her nickname, sex, age, job, region, whether having a camera or not, and personal information, etc., in the first IM client used by the first user himself/herself. The user information is correlated with the user identifier of the first user.

For instance, the first user sets his user information as, sex: male; age: 18; whether having a camera or not: yes; personal information: wishing to study English with age-matched boys. It should be noted that, it is not necessary for users to set all the items about the user information, and the users may only set some items.

The above user information of the first user may further include a filter condition of the first user. How to use the filter condition of the first user will be described in detail in the subsequent embodiments.

Step S102: after receiving an instruction for submitting the user information of the first user, the first IM terminal sends the user information of the first user to an IM server. The user information of the first user may be submitted for the first time, or may be submitted for updating.

From the first user's point of view, the specific operation process may be as follows: after finishing setting the user information, the first user confirms through confirmation buttons, such as OK button or Applying button, in the first IM client. After being confirmed by the first user, the first IM client submits the user information of the first user to the IM server.

In this embodiment, a release flag may be further provided for the user information, so as to indicate whether to make the user information be public. If the release flag of the user information is set as on, the IM server will make the user information be public for the other users. If the release flag of the user information is set as off, the IM server will not make the user information be public for the other users.

The above steps S101 and S102 are processes that the user sets and submits personal relevant information. Process for the user updating the personal information is similar to the above setting process. The difference is as follows. The setting process refers to setting new user information when there is no user information, and submitting the new user information to the IM server. However, the updating process refers to modifying user information when there is the user information. The modifying process may be as follows. The first user submits updated information, and the server updates the user information of the first user after receiving the updated information submitted by the first user. From the first user's point of view, the user information of the first user is modified in the first IM terminal, and the modified user information of the first user is submitted to the IM server. Accuracy of information about the first user may be kept by updating the user information of the first user as mentioned above.

Step S103: the IM server checks whether the release flag of the user information is on when the first user submits the user information, updates the user information, turns on the release flag, logs on, changes his/her status from offline to online, etc. If the release flag is on, proceeding to step S104 and subsequent steps; otherwise, terminating the flow. The online status refers to a status in which the user may receive information. The online status may include an on-line status, invisible status and busying status, etc.

In addition, if the user information does not include the release flag, the IM server may not proceed to step S103, may directly proceed to step S104 and subsequent steps thereof after the first user submits the user information, updates the user information, turns on the release flag, logs on, or changes the status from offline to online or invisible, etc.

Step S104: the IM server uploads the user information of the first user to a Peer to Peer (P2P) server. In addition, before uploading the user information, the IM server may packet the user information of the first user for the convenience of uploading.

Step S105: after receiving the user information of the first user from the IM server, the P2P server immediately informs other IM clients, or informs other IM clients at regular time to remind the other IM clients to download the user information of the first user.

In addition, the IM client may also check whether there is new user information in the P2P server. If there is new user information in the P2P server, the IM client may download the new user information.

The embodiment is described hereinafter taking the second IM client of the second user for example.

Step S106: the second IM client adds the new user information in the P2P server to a downloading queue, to make the new user information become an item to be downloaded in the downloading queue. If the downloading queue of the second IM client is full, the second IM client may not respond to the new user information in the P2P server, till to-be-downloaded items in the downloading queue of the second IM client reduces.

Step S107: the second IM client downloads corresponding user information according to the to-be-downloaded items in the downloading queue. If user information about a certain user is successfully downloaded, the second IM client may save the downloaded user information, and updates a local downloading queue. Updating the local downloading queue may include: deleting a to-be-downloaded item corresponding to the user information, checking whether there is new user information in the P2P server; if there is new user information in the P2P server, adding the new user information to the downloading queue; if the downloading fails, such as packet loss, or validation failure, discarding the downloaded contents by the second IM client, and updating the local downloading queue. Updating the local downloading queue mentioned above may also include: deleting the to-be-downloaded item corresponding to the user information, and checking whether there is new user information in the P2P server; if there is new user information in the P2P server, adding the new user information to the downloading queue.

Step S108: the second IM client checks the downloaded user information according to filter conditions set by the second user, i.e., checks whether each piece of user information meets the filter conditions of the second user. If a certain piece of user information meets the filter conditions of the second user, proceeding to step S109 and subsequent steps; otherwise, discarding the user information.

For instance, the filter conditions set by the second user are "sex: male; age: 16-20". The second IM client checks the user information of the first user after receiving the user information of the first user. "sex: male; age: 18" in the user information of the first user meets the filter conditions "sex: male; age 16-20" set by the second user. Thus, the user information of the first user passes the checking.

When the user information of the first user in step S101 includes the filter conditions of the first user, the second IM client may further check whether the user information of the second user meets the filter conditions of the first user. If the user information of the second user meets the filter conditions of the first user, proceeding to step S109 and subsequent steps. Bidirectional selection may be implemented when checking whether the user information of the second user meets the filter conditions of the first user, thereby the efficiency for establishing IM relationships is further improved. From the second IM client's point of view, checking whether the filter information of the first user meets the filter conditions of the second user. The above checking is a corresponding process, through which the bidirectional selection may be implemented. Thereby, the efficiency for establishing the IM relationships may be further improved.

Step S109: the second IM client may add the user information passing the checking to a display list. When number of user information in the display list reaches the maximal number of the display list, the second IM client may temporarily stop downloading new user information. When the number of user information in the display list is less than the maximal number of the display list, the second IM client may download new user information.

Step S110: the second IM client displays the user information in the display queue for the second user according to the display queue.

The above mentioned displaying the user information in the display queue for the second user may include: receiving a display requesting instruction from a user, and displaying the user information in the queue according to the display requesting instruction. The above display instruction may be the maximal display number or time, etc.

From the second user's point of view, the second user may set the display mode. For instance, the second user may set the maximum display number, that is, how many pieces of user information may be simultaneously displayed at most. The second user may set display time of the user information. The second user may set display times of the user information, etc. The second IM client displays the user information in the display list according to the set display mode. Furthermore, for the second user, after the second IM client filtering the user information of the first user according to the filter conditions of the second user, if the user information of the first user meets the filter conditions of the second user, the user information of the first user may be added to the above display list, and is visible to the second user.

For instance, the set display mode is that, displaying ten pieces of user information at the same time, and displaying each piece of user information for ten seconds. Thus, the second IM client sets a ten-second timer for each piece of user information to be displayed, and displays the user information according to the sequence of the user information in the display list. Furthermore, the second IM client may display each piece of user information in a format of "drift bottle". That is to say, each piece of user information moves within a pre-configured display area to increase enjoyment. If a "drift bottle" has been displayed for ten seconds, the second IM client moves the "drift bottle" to the boundary, terminates the display of the "drift bottle", checks whether there is other user information in the display list, if there is other user information in the display list, displays the next piece of user information.

Step S111: if the second user selects the first user, the second IM client displays the user information of the first user. Selecting the first user by the second user may be that the second IM client receives the identifier, such as picture, of the first user selected by the second user.

From the second user's point of view, the second user selects the user information that is being displayed with an input device, such as keyboard and mouse. Let's assume that the selected user information is the user information of the first user. For instance, the user moves the mouse onto the user information of the first user. The second IM client displays contents of the user information of the first user on an interface according to the selection of the second user. The timing may be paused.

If the user information of the first user in step S101 includes the filter conditions of the first user, displaying the user information of the first user may further include displaying the filter conditions of the first user. The second user may further determine the possibility that the first user and the second user agree to establish the connection with the first user according to the filter conditions of the first user, so as to further improve the efficiency for establishing the IM relationship.

When receiving an instruction for establishing the IM, the second IM client initiates the IM to the first IM client, and establishes the IM relationship with the first IM client. From the second user's point of view, the processes may include the following.

After checking contents of the user information about the selected first user, if the second user determines to establish the IM relationship with the first user, e.g., to add the corresponding first user as contact, or to initiate an IM session with the first user, proceeding to step S112 and subsequent steps. If the second user does not perform any operation, and releases the user information about the selected first user through the input device, the second IM client continues to time the user information of the first user, and performs corresponding subsequent operations.

Step S112: when receiving the instruction for establishing the IM, the second IM client initiates the IM to the first IM client and establishes the IM relationship with the first IM client.

From the second user's point of view, the second user establishes the IM relationship with the selected first user through the second IM client. For instance, if the second user wishes to add the first user as contact, the second user initiates a request to the IM server according to flow in the prior art, to request for adding the first user as contact. The IM server forwards the request to the first user. After receiving the request, the first user may accept the request and may further request to add the second user as contact through the IM server.

If wishing to initiate a temporary session with the first user, the second user sends an IM message to the first user according to the flow in the prior art. After receiving the IM message from the second user, the first user may respond to the IM message.

By adopting embodiments of the present invention, the scene that the success rate for establishing the IM relationship is relatively low caused by the mismatching between the user information of the first user and the filter conditions of the second user in the prior art may be avoided, and the success rate for establishing the IM relationship is improved. In addition, in the embodiments of the present invention, it is not necessary for users to search for suitable IM users. Thus, by adopting embodiments of the present invention, time for establishing the IM relationship may be shortened and the efficiency for establishing the IM relationship may be improved.

Figure 2:
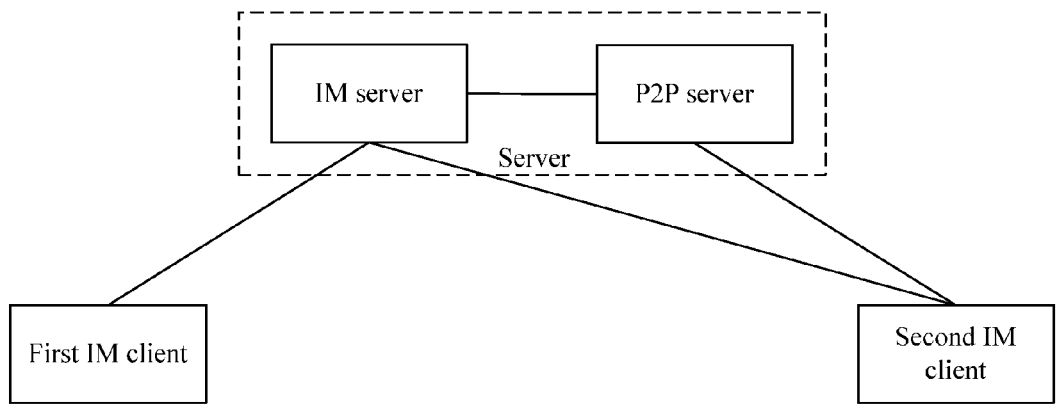
FIG. 2 is a schematic diagram illustrating structure of a system for establishing an IM relationship in accordance with an embodiment of the present invention.

FIG. 2 is a schematic diagram illustrating structure of a system for establishing an IM relationship in accordance with an embodiment of the present invention.

As shown in FIG. 2, the system for establishing the IM relationship includes a server and multiple IM clients. Here, the system is described taking the first and second IM clients for example.

In addition to possessing regular functions of an IM server, the server is mainly configured to send the user information of the first user to the second IM client of the second user. If the user information includes the release flag, the server further checks whether the release flag of the user information about the first user indicates "on", if the release flag of the user information about the first user indicates "on", the server sends the user information of the first user to the second IM client of the second user, otherwise, the server will not send the user information of the first user.

Here, the above sending mainly refers to that, the server informs the second IM client to download the user information of the first user, or the second IM client actively checks the server and finds it is necessary to download, and then the second IM client downloads the user information of the first user.

In addition to possessing regular functions of an IM client, the first IM client is mainly configured to set user information of the first user, and submit the user information of the first user to the server. The first IM client may be further configured to update the user information of the first user.

In addition to possessing regular functions of an IM client, the second IM client is further configured to check whether the user information of the first user meets the filter conditions of the second user, and establish the IM relationship between the first user and the second user if the user information of the first user meets the filter conditions of the second user.

Specifically speaking, the second IM client adds the user information of the first user in the P2P server to a downloading queue, to make the user information of the first user become a to-be-downloaded item in the downloading queue, and download corresponding user information according to the to-be-downloaded item in the downloading queue.

Then, the second IM client checks each piece of downloaded user information according to the filter conditions set by the second user, checks whether each piece of user information meets requirements. If a certain piece of user information does not meet the requirements, the second IM client discards the certain piece of user information; otherwise, the second IM client adds the user information that passes the checking to a display list. In the process, if number of user information in the display list reaches the maximal number of the display list, the second IM client temporarily stops downloading new user information, and then resumes downloading new user information when the number of user information in the display list is less than the maximal number of the display list.

The second IM client displays the user information in the display list for the second user according to the display list. After the second user selects a piece of user information which is being displayed with an input device, such as keyboard and mouse, etc., the second IM client displays contents of the selected user information on the interface. If the second user determines to establish an IM relationship with the selected first user, i.e., to add corresponding first user as contact or to initiate an IM session with the first user, the second IM client establishes an IM relationship with the selected first user according to an instruction of the user.

The second IM client may be further configured to set the filter conditions for the second user. The second IM client may be further configured to set a display mode for the user information.

In addition, in the system for establishing the IM relationship as shown in FIG. 2, each IM client may only possess functions of the first IM client or only possess functions of the second IM client. Under normal circumstances, each IM client in the IM system may simultaneously possess functions of the above first and second IM clients.

As shown in FIG. 2, the server may include an IM server and a P2P server. The IM server is mainly configured to send the user information of the first user to the P2P server. If the user information includes a release flag, the IM server further checks whether the release flag of the user information about the first user indicates "on", if the release flag of the user information about the first user indicates "on", the IM server uploads the user information of the first user to the P2P server; otherwise, the IM server will not upload the user information of the first user to the P2P server.

The P2P server in the server shown in FIG. 2 sends the user information of the first user to the second IM client of the second user mainly using the P2P mode. Specifically speaking, after receiving the user information of the first user, the P2P server informs the second IM client immediately or at regular time, so as to remind the second IM client to download the user information of the first user. Then, the second IM client downloads the user information of the first user using the P2P mode. Alternatively, the second IM client checks whether there is new user information in the P2P server. If there is new user information in the P2P server, the second IM client downloads the user information using the P2P mode.

Persons having ordinary skill in the art may learn that all or some steps in the above method described in embodiments of the present invention may be implemented via hardware instructed by programs. The programs may be stored in a kind of computer-readable storage medium. The above mentioned storage medium may be Read-Only memory (ROM), disk or a CD, etc.

The IM method and system provided by embodiments of the present invention are described in detail in the foregoing. The present invention describes the principle and implementation modes with specific embodiments. Explanation for the above embodiments is merely used for understanding the method and core idea of the present invention. Meanwhile, for persons having ordinary skill in the art, various modifications may be made to specific implementing modes and application scope according to idea of the invention. To sum up, contents in the specification should not be understood as limitation of the present invention.

The invention claimed is:

1. A method for establishing an Instant Messaging, IM, relationship, comprising:

receiving user information of a first user, wherein the user information of the first user comprises filter conditions of the first user; and initiating an IM to a first IM client and establishing an IM relationship with the first IM client, when the user information of the first user meets filter conditions of a second user, and user information of the second user meets the filter conditions of the first user;

initiating, by a second IM client, the IM to the first IM client and establishing the IM relationship with the first IM client when the first user submits the user information of the first user, updates the user information of the first user, logs on, changes from an offline status to an online status, when the user information of the first user meets the filter conditions of the second user, and the user information of the second user meets the filter conditions of the first user; and sending the user information of the first user to the second IM client when the first user sets the release flag in the user information of the first user as on.

2. A method for establishing an Instant Messaging, IM, relationship, comprising:

receiving, by a server, user information set by a first user, and sending the user information of the first user to a second IM client when a release flag in the user information of the first user is on, wherein the user information of the first user comprises filter conditions of the first user; and receiving, by the second IM client, the user information of the first user, initiating an IM to a first IM client and establishing an IM relationship with the first IM client when the user information of the first user meets filter conditions of a second user, and user information of the second user meets the filter conditions of the first user;

initiating, by the second IM client, the IM to the first IM client and establishing the IM relationship with the first IM client when the first user submits the user information of the first user, updates the user information of the first user, logs on, changes from an offline status to an online status, when the user information of the first user meets the filter conditions of the second user, and the user information of the second user meets the filter conditions of the first user; and sending the user information of the first user to the second IM client when the first user sets the release flag in the user information of the first user as on.

3. The method according to claim 2, before receiving by the server the user information set by the first user, further comprising:

setting, by the first user, the user information of the first user, and submitting the user information to the server.

4. The method according to claim 2, wherein receiving by the server the user information set by the first user comprises:

receiving, by the server, updated information set by the first user, and updating the user information of the first user in the server.

5. The method according to claim 2, before initiating by the second IM client the IM to the first IM client, further comprising:

updating, by the second user, the filter conditions of the second user in the second IM client.

6. The method according to claim 2, wherein sending the user information of the first user to the second IM client comprises:

sending the user information of the first user to the second IM client through a Peer to Peer, P2P mode.

7. The method according to claim 2, before initiating by the second IM client the IM to the first IM client and establishing the IM relationship with the first IM client, further comprising:

selecting, by the second user, the first user; and
displaying, by the second IM client, the user information of the first user.

8. A system for establishing an Instant Messaging, IM, relationship, comprising:

a server, configured to send user information of a first user to a second IM client of a second user, wherein the user information of the first user comprises filter conditions of the first user; and the second IM client, configured to check whether the user information of the first user meets filter conditions of the second user, whether user information of the second user meets the filter conditions of the first user, and establish an IM relationship between the first user and the second user when the user information of the first user meets the filter conditions of the second user, and the user information of the second user meets the filter conditions of the first user, wherein the second IM client initiates the IM to a first IM client and establishing the IM relationship with the first IM client when the first user submits the user information of the first user, updates the user information of the first user, logs on, changes from an offline status to an online status, when the user information of the first user meets the filter conditions of the second user, and the user information of the second user meets the filter conditions of the first user; and sending the user information of the first user to the second IM client when the first user sets the release flag in the user information of the first user as on.

9. The system according to claim 8, further comprising:
a first IM client, configured to set the user information of the first user, and/or submit the user information of the first user to the server, and/or update the user information of the first user.

10. The system according to claim 8, wherein the server comprises:

an IM server, configured to upload the user information of the first user to a Peer to Peer, P2P, server; and
the P2P server, configured to send the user information of the first user to the second IM client using a P2P mode.

11. The method according to claim 3, wherein receiving by the server the user information set by the first user comprises:

receiving, by the server, updated information set by the first user, and updating the user information of the first user in the server.

* * * * *